(12) United States Patent
Saito et al.

(10) Patent No.: US 8,125,305 B2
(45) Date of Patent: Feb. 28, 2012

(54) INDUCTANCE ELEMENT, METHOD FOR MANUFACTURING THE SAME, AND SWITCHING POWER SUPPLY USING THE SAME

(75) Inventors: Tadao Saito, Yokohama (JP); Kazumi Sakai, Yokohama (JP); Katsuhiko Yamada, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 318 days.

(21) Appl. No.: 12/599,315

(22) PCT Filed: May 20, 2008

(86) PCT No.: PCT/JP2008/001251
§ 371 (c)(1),
(2), (4) Date: Nov. 9, 2009

(87) PCT Pub. No.: WO2008/142865
PCT Pub. Date: Nov. 27, 2008

(65) Prior Publication Data
US 2011/0205765 A1    Aug. 25, 2011

(30) Foreign Application Priority Data
May 21, 2007    (JP) .................. 2007-134032

(51) Int. Cl.
  *H01F 27/28* (2006.01)
  *H01F 27/02* (2006.01)
  *H01F 7/06* (2006.01)

(52) U.S. Cl. ............ 336/90; 336/96; 336/229; 29/602.1

(58) Field of Classification Search .................. 336/229, 336/96, 92, 90; 29/602.1
See application file for complete search history.

(56) References Cited

U.S. PATENT DOCUMENTS
3,483,495 A * 12/1969 De Turris et al. ............... 336/65
3,483,497 A * 12/1969 Clark et al. ..................... 336/96
(Continued)

FOREIGN PATENT DOCUMENTS
JP    5 59812    8/1993
(Continued)

OTHER PUBLICATIONS
Japanese Industrial Standard Z 2246, "Shore Hardness Test-Test Method", Japanese Standards Association, Total pp. 12 (Nov. 20, 2000) (with English Translation).
(Continued)

*Primary Examiner* — Anh Mai
(74) *Attorney, Agent, or Firm* — Oblon, Spivak, McClelland, Maier & Neustadt, L.L.P.

(57) ABSTRACT

An inductance element (1) includes a doughnut-shaped magnetic core (2) and a bottomed container (3) for housing the doughnut-shaped magnetic core (2). The bottomed container (3) has a cylindrical outer wall portion, a cylindrical inner wall portion, a bottom portion, an open section and a hollow portion. The open section of the bottomed container (3) is covered with an adhesive portion (4) for integrally fixing the doughnut-shaped magnetic core (2) and the bottomed container (3). The adhesive portion (4) has an extended portion (4a) extended in the cylindrical inner wall portion. The ratio (B/A) of a length (B) of the extended portion (4a) to a height (A) of the cylindrical inner wall portion is in a range of 0.1 to 0.5.

15 Claims, 6 Drawing Sheets

U.S. PATENT DOCUMENTS

| | | | |
|---|---|---|---|
| 4,611,191 A * | 9/1986 | Souchere | 336/84 R |
| 5,226,220 A * | 7/1993 | Gevas et al. | 29/605 |
| 6,566,993 B1 * | 5/2003 | Otsuka et al. | 336/83 |
| 2001/0005166 A1 * | 6/2001 | Coulombier | 336/90 |
| 2003/0156000 A1 * | 8/2003 | Brunner | 336/96 |
| 2004/0074564 A1 * | 4/2004 | Brunner | 148/105 |
| 2005/0012581 A1 * | 1/2005 | Ono et al. | 336/90 |

FOREIGN PATENT DOCUMENTS

| | | |
|---|---|---|
| JP | 2602843 | 1/1997 |
| JP | 10 251552 | 9/1998 |
| JP | 11 345714 | 12/1999 |
| JP | 2001 319814 | 11/2001 |
| JP | 2004 186573 | 7/2004 |

OTHER PUBLICATIONS

Japanese Industrial Standard Z 7727, "Shore Hardness Test-Verification of Testing Machines", Japanese Standards Association, Total pp. 14 (Jul. 21, 2000) (with English Translation).

Japanese Industrial Standard B 7731, "Shore Hardness Test-Calibration of Reference Blocks", Japanese Standards Association, Total pp. 16 (Jul. 21, 2000) (with English Translation).

U.S. Appl. No. 12/530,108, filed Sep. 4, 2009, Saito, et al.

* cited by examiner

INDUCTANCE ELEMENT, METHOD FOR MANUFACTURING THE SAME, AND SWITCHING POWER SUPPLY USING THE SAME

TECHNICAL FIELD

The present invention relates to an inductance element, its manufacturing method, and a switching power supply using the inductance element.

BACKGROUND ART

The noise from a switching power supply mounted on electronic equipment is restricted by classes as represented by the FCCI. There are various causes of generating a noise in the power supply, and the noise is mainly generated around a semiconductor element which turns on/off a large amount of power. A high-frequency component propagates as the radiated noise through space and causes a malfunction of various types of electronic equipment. Therefore, a regulation value is set for each frequency band. The switching power supply is provided with an anti-noise measure for a semiconductor element, mainly a MOS-FET or a diode. As a typical example of the anti-noise measure for the MOS-FET or the diode, there is an anti-noise measure using a CR snubber or ferrite beads.

The anti-noise measure is selected depending on a balance of the effects, cost and mounting space. When the performance is especially taken into consideration, the anti-noise measure using a Co-based amorphous material is used mainly as described in Patent Reference 1. Since the Co-based amorphous material has excellent magnetic characteristics, its noise reducing effect is better than the ferrite beads. But, a toroidal core using a Co-based amorphous magnetic ribbon is generally covered entirely with a resin, and therefore it has a problem that the resin penetrates between layers of the magnetic ribbon and applies a stress to the toroidal core by contracting when dried, resulting in degradation of the magnetic characteristics.

Patent Reference 2 and Patent Reference 3 describe a noise suppression element that a core is inserted into a bottomed container, and a lid is fixed to house the core in the container. When the lidded container is used, the problem involved in the contraction of the resin is avoided, and the magnetic characteristics can be suppressed from degrading. But, the lidded container requires that its lid and container body are separately produced and fixed into one body by assembling them. To produce the lid and the container body with a resin material, it is necessary to prepare their independent metal molds and to perform resin molding by the metal molds.

As described above, the lidded container requires the separate metal molds for the lid and the container body, and their preparation has a problem that the preparation percentage in the production cost is large. Besides, the noise suppression element described in Patent Reference 2 requires a step of inserting the lid into the container body. The noise suppression element described in Patent Reference 3 requires a step of fixing the container body and the lid by welding. Since the noise suppression element using the lidded container requires a step of attaching the lid, it has a problem that it is inferior in mass production.

Patent Reference 1: JP-B2 2602843 (Patent Registration)
Patent Reference 2: JP-A Hei 11-345714 (KOKAI)
Patent Reference 3: JP-A 2001-319814 (KOKAI)

DISCLOSURE OF INVENTION

The present invention provides an inductance element which suppresses magnetic characteristics from degrading and omits a lid portion to make it possible to improve mass productivity, its manufacturing method, and a switching power supply using the inductance element.

An inductance element according to an aspect of the present invention comprises a doughnut-shaped magnetic core; a bottomed container having a cylindrical outer wall portion, a cylindrical inner wall portion arranged within the cylindrical outer wall portion, a bottom portion disposed at an end of each of the cylindrical outer wall portion and the cylindrical inner wall portion to close a space between them, an open section provided at the other end of each of the cylindrical outer wall portion and the cylindrical inner wall portion and a hollow portion disposed within the cylindrical inner wall portion, wherein the doughnut-shaped magnetic core is housed between the cylindrical outer wall portion and the cylindrical inner wall portion; and an adhesive portion, disposed on the side of the open section of the bottomed container, integrally fixing the doughnut-shaped magnetic core and the bottomed container, wherein the adhesive portion has an extended portion extended into the cylindrical inner wall portion, and a ratio (B/A) of a length (B) of the extended portion to a height (A) of the cylindrical inner wall portion is in a range of 0.1 to 0.5.

A method for manufacturing an inductance element according to an aspect of the present invention comprises housing a doughnut-shaped magnetic core into a bottomed container having a cylindrical outer wall portion, a cylindrical inner wall portion disposed within the cylindrical outer wall portion, a bottom portion disposed at an end of each of the cylindrical outer wall portion and the cylindrical inner wall portion to close a space between them, an open section provided at the other end of each of the cylindrical outer wall portion and the cylindrical inner wall portion and a hollow portion disposed within the cylindrical inner wall portion; coating an adhesive on a side of the open section of the bottomed container in which the doughnut-shaped magnetic core is housed; and forming an adhesive portion, which integrally fixes the doughnut-shaped magnetic core and the bottomed container, by drying the adhesive for curing.

A switching power supply according to an aspect of the invention comprises the inductance element according to the aspect of the invention as a noise suppression element.

EXPLANATION OF NUMERALS

1 ... Inductance element, 2 ... doughnut-shaped magnetic core, 3 ... bottomed container, 4 ... adhesive portion, 4a ... adhesive portion, 5 ... cylindrical outer wall portion, 6 ... cylindrical inner wall portion, 7 ... bottom portion, 8 ... open section, 9 ... hollow portion, 10 ... conductive lead, 11 ... lead insertion part, 21, 41, 51 ... switching power supply, 24 ... transformer, 26 ... FET, 29, 29A, 29B ... saturable inductor.

MODE FOR CARRYING OUT THE INVENTION

Figure 1:
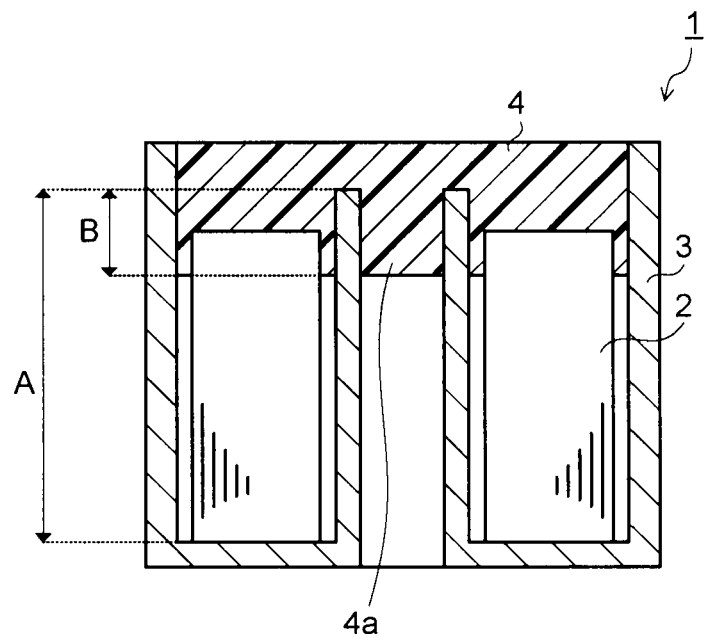
FIG. 1 is a sectional view showing an inductance element according to an embodiment of the invention.
Figure 2:
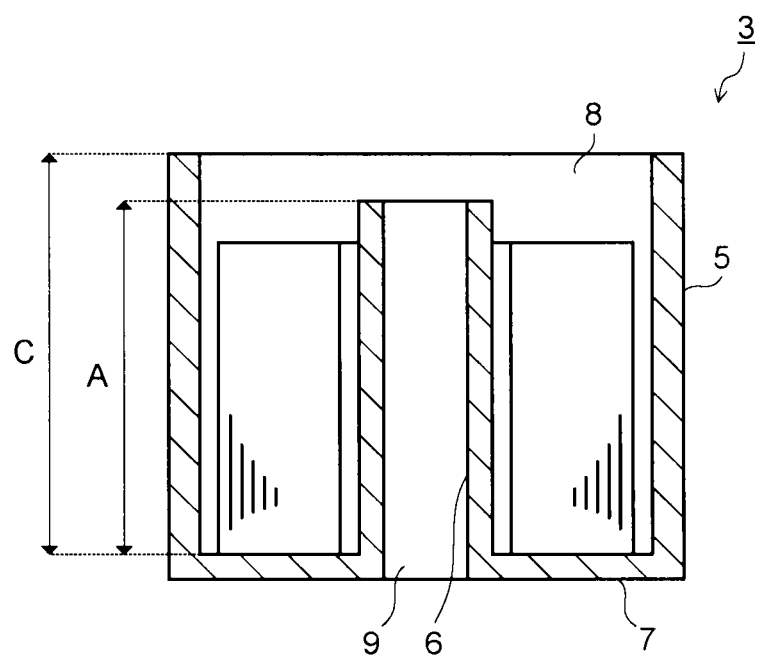
FIG. 2 is a sectional view showing a state that a doughnut-shaped magnetic core is housed in a bottomed container according to an embodiment of the invention.

Modes of conducting the present invention will be described below with reference to the drawings. FIG. 1 is a diagram showing an inductance element according to an embodiment of the invention. An inductance element 1 shown in FIG. 1 includes a doughnut-shaped magnetic core 2, a bottomed container 3 and an adhesive portion 4. FIG. 2 shows a state that the doughnut-shaped magnetic core 2 is housed in the bottomed container 3, namely a state before the adhesive portion 4 is formed.

The doughnut-shaped magnetic core 2 is not limited to a particular one and may be a soft magnetic body having a hollow shape. As the soft magnetic body configuring the doughnut-shaped magnetic core 2, a ferrite, a permalloy, an amorphous magnetic alloy, an Fe base magnetic alloy having a microcrystalline structure or the like is applied. For the doughnut-shaped magnetic core 2, various forms of magnetic cores such as a wound body of a soft magnetic alloy ribbon or a stacked body of soft magnetic alloy ribbons, a sintered body of soft magnetic alloy powder, soft magnetic alloy powder solidified with a resin, etc. can be used.

A soft magnetic body which forms the doughnut-shaped magnetic core 2 is preferably a Co base amorphous magnetic alloy, an Fe base amorphous magnetic alloy, an Fe base magnetic alloy having a microcrystalline structure or the like. Since such alloys are readily used to obtain a magnetic alloy ribbon having a thickness of 30 μm or below, they are suitable for a constituent material of the doughnut-shaped magnetic core 2. By winding or stacking the magnetic alloy ribbon, the doughnut-shaped magnetic core 2, a so-called toroidal type magnetic core, can be produced easily.

It is preferable that the amorphous alloy which forms the doughnut-shaped magnetic core 2 has a composition represented by the following formula (1).

General formula: $(T_{1-a}M_a)_{100-b}X_b$ 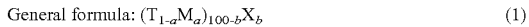 (1)

(where, T denotes at least one element selected from Fe and Co, M denotes at least one element selected from Ti, V, Cr, Mn, Ni, Cu, Zr, Nb, Mo, Ta and W, X denotes at least one element selected from B, Si, C and P, and a and b denote a value satisfying $0 \leq a \leq 0.5$, $10 \leq b \leq 35$ at %)

The element T is adjusted its composition ratio depending on the required magnetic characteristics such as a magnetic flux density and iron loss. The element M is an element which is added to control the thermal stability, corrosion resistance and crystallization temperature. The element M is more preferably at least one element selected from Cr, Mn, Zr, Nb and Mo. The contained amount of the element M is 0.5 or less as the value a. If the contained amount of the element M is excessively large, the amount of the element T is decreased relatively, so that the magnetic characteristics of the amorphous magnetic alloy ribbon become low. The value a indicating the contained amount of the element M is preferably 0.01 or more in view of practice.

The element X is an element essential to obtain an amorphous alloy. Especially, B is an element effective to provide a magnetic alloy in an amorphous state. Si is an element effective to assist the formation of an amorphous phase and to increase a crystallization temperature. If the added amount of the element X is excessively large, magnetic permeability is decreased or fragility is caused. If the added amount of the element X is excessively small, it is hard to obtain the magnetic alloy in the amorphous state. Therefore, the contained amount of the element X is preferably determined to be in a range of 10 to 35 at %.

In addition, the Co base amorphous alloy ribbon excelling in a saturable characteristic is preferably used as the magnetic alloy ribbon which configures the doughnut-shaped magnetic core 2. The magnetic characteristics of the doughnut-shaped magnetic core 2 can be improved by using the Co base amorphous alloy ribbon. It is preferable that the Co base amorphous alloy ribbon has a composition represented by the following formula (2).

General formula: $Co_aFe_bM_cSi_dB_e$ 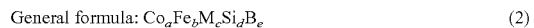 (2)

(where, $a+b+c+d+e=100$ at %, $3 \leq b \leq 7$ at %, $0.5 \leq c \leq 3$ at %, $9 \leq d \leq 18$ at %, $7 \leq e \leq 16$ at %)

In the formula (2), the element M is preferably at least one element selected from Nb, Cr, W, Mo and Ta. By containing the element M as an essential component, the thermal resistance of the Co base amorphous alloy ribbon is improved. By improving the thermal resistance of the Co base amorphous alloy ribbon, the magnetic characteristics of the doughnut-shaped magnetic core 2 can be suppressed from lowering in the drying process described later. The element M is desirably Nb. The Nb specially contributes to improvement of the thermal resistance of the Co base amorphous alloy ribbon.

The amorphous alloy ribbon to be used as the magnetic alloy ribbon is preferably produced by applying a liquid quenching method. Specifically, the amorphous alloy ribbon can be obtained by quenching an alloy material, which is adjusted to a predetermined composition ratio, from a molten state at a cooling speed of $10^{5°}$ C./sec. or higher. The amorphous alloy produced by the liquid quenching method becomes a ribbon. The amorphous alloy ribbon has a thickness of preferably 30 μm or below, and more preferably 8 to 20 μm. A low-loss magnetic core can be obtained by controlling the thickness of the magnetic ribbon.

It is preferable that the Fe base magnetic alloy having the microcrystalline structure has a composition represented by the following formula (3).

General formula: $Fe_aCu_bM_cSi_dB_e$ 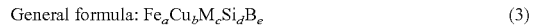 (3)

(where, M denotes at least one element selected from a 4a group element, a 5a group element, a 6a group element, Mn, Ni, Co and Al, and $a+b+c+d+e=100$ at %, $0.01 \leq b \leq 4$ at %, $0.01 \leq c \leq 10$ at %, $10 \leq d \leq 25$ at %, $3 \leq e \leq 12$ at %, and $17 \leq d+e \leq 30$ at %)

In the composition of the formula (3), Cu is an element effective to enhance corrosion resistance, to prevent the crystal grain from becoming coarse and to improve the soft magnetic characteristics such as an iron loss and magnetic permeability. The element M is an element effective for homogenization of a crystal diameter, for reduction of magnetostriction and magnetic anisotropy, and for improvement of the magnetic characteristics against a temperature change. The magnetic alloy preferably has a microstructure in which crystal grains having a grain diameter of 5 to 30 nm are contained in the alloy at an area ratio of 50% or more, and preferably 90% or more.

For example, the Fe base magnetic alloy ribbon having the microcrystalline structure is produced as follows. First, the amorphous alloy ribbon having the alloy composition of the formula (3) is produced by the liquid quenching method. The amorphous alloy ribbon is thermally treated at −50 to +120° C. of a crystallization temperature for one minute to five hours to precipitate microcrystals. Otherwise, when the alloy ribbon is produced by the liquid quenching method, the quenching temperature is controlled to precipitate the microcrystals directly. The magnetic alloy ribbon has a thickness of preferably 30 μm or below, and more preferably 8 to 20 μm, similar to the amorphous alloy ribbon.

The above-described magnetic alloy ribbon is wound to produce a wound body. Otherwise, the magnetic alloy ribbons are stacked to produce a stacked body. The winding number or the stacking number is appropriately determined depending on the required magnetic characteristics. If necessary, an insulating layer may be disposed on a surface of the magnetic alloy ribbon. The wound body is formed by winding the magnetic alloy ribbon to form a hollow portion at its center. A magnetic core having the hollow portion at the center, namely the doughnut-shaped magnetic core 2, can be obtained by winding the magnetic alloy ribbon.

The stacked body is formed by stacking the magnetic alloy ribbons with the hollow portion formed at the center. For example, the magnetic alloy ribbon is cut to a predetermined length to produce short magnetic alloy strips, and a hole is formed in the centers of the short magnetic alloy strips. The magnetic core having a hollow portion at the center is formed by stacking the short magnetic alloy strips. In other words, the doughnut-shaped magnetic core 2 can be obtained.

The doughnut-shaped magnetic core 2 is housed in the bottomed container 3. The bottomed container 3 has a cylindrical outer wall portion 5 and a cylindrical inner wall portion 6 which is concentrically disposed within the cylindrical outer wall portion 5. A bottom portion 7 is disposed at one end of each of the cylindrical outer wall portion 5 and the cylindrical inner wall portion 6 to close a gap between them. An open section 8 is provided at the other end of each of the cylindrical outer wall portion 5 and the cylindrical inner wall portion 6. A hollow portion 9 is formed within the cylindrical inner wall portion 6. The doughnut-shaped magnetic core 2 is housed between the cylindrical outer wall portion 5 and the cylindrical inner wall portion 6.

The bottomed container 3 is preferably formed of an insulating material. The bottomed container 3 is preferably formed of an insulating resin such as PBT (polybutylene terephthalate), PET (polyethylene terephthalate), LCP (liquid crystal polymer) or the like. Each portion preferably has a thickness in a range of 0.05 to 1 mm. The bottomed container 3 is formed integrally by metal molding. The cylindrical outer wall portion 5, the cylindrical inner wall portion and the bottom portion 7 desirably have an integral shape.

The adhesive portion 4 is formed by coating the adhesive on the open section side of the bottomed container 3 in which the doughnut-shaped magnetic core 2 is housed and drying it to cure. The adhesive portion 4 is formed to cover the open section of the bottomed container 3 and also to integrally fix the doughnut-shaped magnetic core 2 and the bottomed container 3. The adhesive portion 4 has insulating properties and can serve to make external insulation and to fix the magnetic core 2. Here, the cured state of the adhesive is called as the adhesive portion 4. The "integral fixing" means a fixed state of the doughnut-shaped magnetic core 2 and the bottomed container 3 by the continuous adhesive portion 4.

When the doughnut-shaped magnetic core 2 and the bottomed container 3 are integrally fixed, the adhesive portion 4 is not limited about an area of covering the open section of the bottomed container 3. The adhesive portion 4 may be formed to cover the whole open section of the bottomed container 3 or to cover partly the open section. It is preferable that the adhesive portion 4 is formed to wholly cover the open section of the bottomed container 3 in order to enhance the bonding strength between the doughnut-shaped magnetic core 2 and the bottomed container 3.

In the inductance element 1 of this embodiment, the open section of the bottomed container 3 housing the doughnut-shaped magnetic core 2 therein is covered with the adhesive portion 4, and the doughnut-shaped magnetic core 2 and the bottomed container 3 are integrally fixed with the adhesive portion 4. Therefore, it is not necessary to provide a lid independent of the bottomed container 3. And, metal molds for the lid are unnecessary. A process of attaching the lid is also unnecessary. Accordingly, the production process of the inductance element 1 can be simplified, and production and equipment cost can be reduced.

The adhesive portion 4 is formed by curing the adhesive, and for example a bonding strength of 1 kgf or more can be obtained easily. Therefore, the adhesive portion 4 can be prevented from falling when the conductive lead is inserted into the hollow portion of the inductance element 1. Especially, the adhesive portion 4 can be prevented from falling even when the conductive lead is inserted from a side of the inductance element 1 opposite to the adhesive portion 4. Here, the bonding strength of 1 kgf or more means that the adhesive portion 4 is not separated when a load of 1 kg is applied by means of a weight or the like.

A type (conventional inductance element) that the lid which is formed by curing the resin is press fitted into the container might have its lid separated when the conductive lead is inserted. Especially, when the press fitting only is employed, the lid tends to separate easily when the lead portion is inserted from the side opposite to the press fitting direction. It is because the bonding strength cannot be improved sufficiently by merely press fitting the lid into the container.

The adhesive for forming the adhesive portion 4 is not limited to particular one, but a silicone resin-based adhesive, an epoxy resin-based adhesive, a phenol resin-based adhesive, an acrylic resin-based adhesive, and a polyurethane resin-based adhesive is used. If it is possible to cure the adhesive at room temperature, production efficiency of the inductance element 1 is improved. When an adhesive cures under a high temperature in a short time, production efficiency of the inductance element 1 is further improved.

But, considering shortening of a drying process, mechanical properties after curing and the like, it is preferable that the adhesive is dried at a temperature in a range of 90 to 150° C. for a range of 30 minutes to two hours. It is more preferable that the drying conditions are determined to be 110 to 130° C. and 50 to 70 minutes. When the drying temperature of the adhesive is less than 90° C., it is necessary to increase the drying time. When the drying time becomes long, the penetration range of the adhesive to the doughnut-shaped magnetic core 2 becomes excessively large. When the drying temperature of the adhesive exceeds 150° C., the drying time decreases, but the magnetic characteristics of the doughnut-shaped magnetic core 2 might be lowered. The above production conditions can be applied to improve the production efficiency of the inductance element 1.

Therefore, the mass productivity of the inductance element 1 is improved considerably.

Hardness (Shore hardness A) of the adhesive portion 4 formed by curing the adhesive is preferably 100 or below. When the hardness (Shore hardness A) of the adhesive portion 4 exceeds 100, a stress to the doughnut-shaped magnetic core 2 becomes large, and there is a possibility that the magnetic characteristics of the doughnut-shaped magnetic core 2 are adversely affected. The hardness (Shore hardness A) of the adhesive portion 4 is more preferably 70 or below. A lower limit value of the hardness of the adhesive portion 4 is not limited, but Shore hardness A of 20 or more is preferable in view of strength of the adhesive portion 4.

As an adhesive which is provided with such hardness, an acryl modified silicone resin-based adhesive is available. The adhesive forming the adhesive portion 4 may be only one kind or a mixture of two or more kinds of adhesives. The hardness should be measured according to JIS-Z-2246 (test methods), JIS-B-7727 (testing machines) and JIS-B-7731 (test specimens). Hardness of hard resin such as an epoxy resin should be measured according to Shore hardness D.

Figure 3:
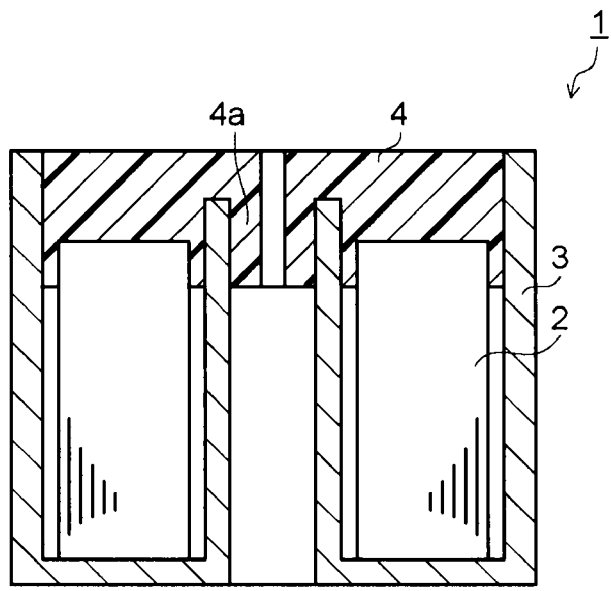
FIG. 3 is a sectional view showing a modified example of the inductance element shown in FIG. 1.
Figure 4:
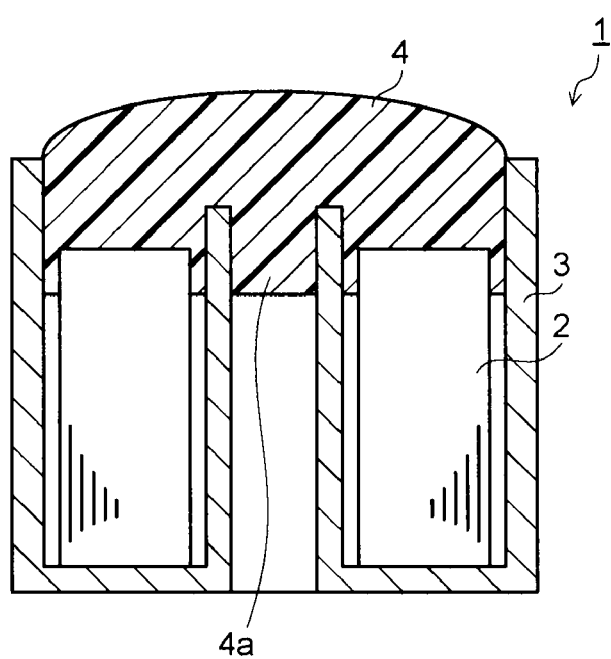
FIG. 4 is a sectional view showing another modified example of the inductance element shown in FIG. 1.

In the inductance element 1 of this embodiment, when the doughnut-shaped magnetic core 2, the bottomed container 3 and the conductive lead portion 5 are integrally fixed with the adhesive portion 4, the adhesive portion 4 is extended to the inside of the cylindrical inner wall portion. The adhesive portion 4 is partly extended into the cylindrical inner wall portion to have an extended portion 4a. The extended portion 4a has a shape to cover the whole hollow portion corresponding to the inside of the cylindrical inner wall portion as shown in FIG. 1, a shape along the inside of the cylindrical inner wall portion as shown in FIG. 3, or the like. The surface of the adhesive portion 4 on the side opposite to the doughnut-shaped magnetic core 2 may has a flat shape as shown in FIG. 1 or a bulged shape (convex shape) from the bottomed container 3 as shown in FIG. 4.

Figure 5:
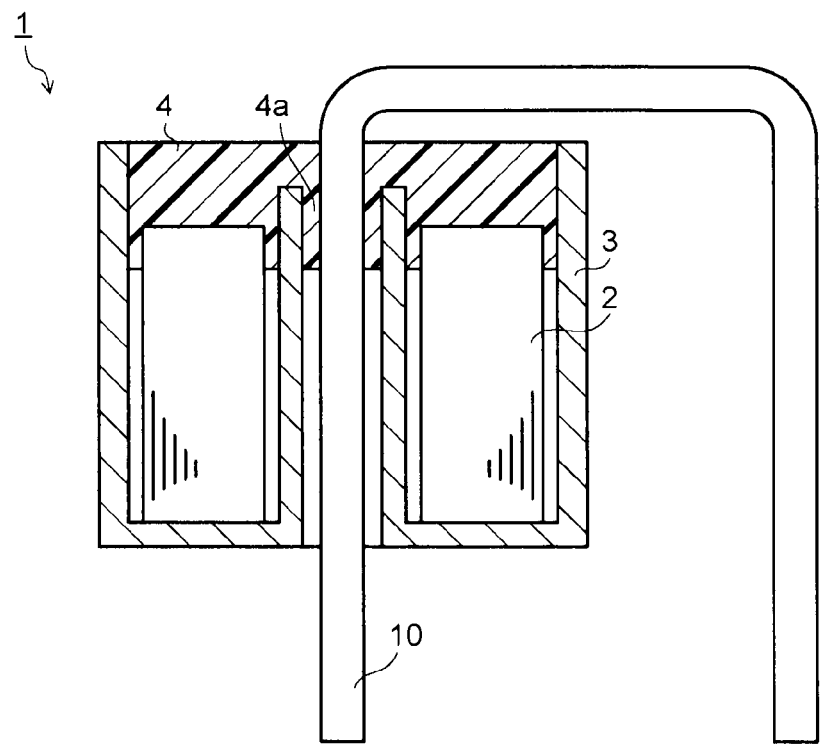
FIG. 5 is a sectional view showing a state that a conductive lead is inserted in the inductance element shown in FIG. 1.

For example, the inductance element 1 is used with a conductive lead 10 inserted through the hollow portion as shown in FIG. 5. When the adhesive portion 4 is extended into the hollow portion corresponding to the inside of the cylindrical inner wall portion, the conductive lead 10 inserted through the hollow portion can be fixed by the extended portion 4a of the adhesive portion 4. Therefore, it is not necessary to fix a conventionally required doughnut-shaped inductance element to the conductive lead with an adhesive or the like. In a case where the inductance element is used in a field of automobiles or the like where vibration is big, an adhesive or the like may also be used for fixing.

In addition, the inductance element 1 of this embodiment is determined that a ratio (B/A) of a length (B) of the extended portion 4a of the adhesive portion 4 to a height (A) of the cylindrical inner wall portion of the bottomed container 3 is in a range of 0.1 to 0.5. The height (A) of the cylindrical inner wall portion denotes a length of the cylindrical inner wall portion in the axial direction, and the thickness of the bottom portion is excluded. The length (B) of the extended portion 4a denotes a length of the adhesive portion 4, which is present within the cylindrical inner wall portion, in the same direction as the height (A) of the cylindrical inner wall portion.

When the B/A ratio is less than 0.1, the extended portion 4a is small and a contact area with the conductive lead is insufficient, so that a satisfactory effect of fixing the conductive lead cannot be obtained. In addition, the insulating properties of the conductive lead are also insufficient. If the B/A ratio exceeds 0.5, a fixing force is excessively large, a small-diameter lead, a diode lead represented by T220 or the like, fails to stick, and if the lead is forcedly inserted, it is deformed, the adhesive portion 4 is separated, or the like takes place.

Considering the fixing force of the conductive lead by the extended portion 4a of the adhesive portion 4, separation prevention of the adhesive portion 4, etc., the B/A ratio of the extended portion 4a is preferably in a range of 0.2 to 0.4. The length (B) of the extended portion 4a is not required to be constant. If the length (B) of the extended portion 4a is variable, each part of the extended portion 4a is measured for its length, and the length (B) of the extended portion 4a is calculated from the average value of the measurements.

As shown in FIG. 1 or the like, it is preferable that the adhesive portion 4 penetrates between the doughnut-shaped magnetic core 2 and the bottomed container 3, namely between the outer diameter of the doughnut-shaped magnetic core 2 and the cylindrical outer wall portion, and between the inner diameter of the doughnut-shaped magnetic core 2 and the cylindrical inner wall portion, in the bottomed container 3. The penetration of the adhesive portion 4 between the doughnut-shaped magnetic core 2 and the bottomed container 3 can further reinforce the fixing between the doughnut-shaped magnetic core 2 and the bottomed container 3.

In addition, it is preferable that the adhesive portion 4 penetrates to a range of 5 to 30% of a cross-sectional area of the doughnut-shaped magnetic core 2. When the doughnut-shaped magnetic core 2 housed in the bottomed container 3 is cut parallel to the hollow portion through the center of the doughnut and the cross-sectional area of the magnetic core 2 is determined to be 100%, it is preferable that the adhesive portion 4 has penetrated from the open section side into the doughnut-shaped magnetic core 2 with an area ratio of 5 to 30%. Thus, the bonding strength between the doughnut-shaped magnetic core 2 and the bottomed container 3 can be improved furthermore with the magnetic characteristics of the doughnut-shaped magnetic core 2 prevented from degrading.

For example, when the wound body is formed of the magnetic alloy ribbon, the cross-sectional area (100%) of the magnetic core 2 indicates a range enclosed by an outermost layer and an innermost layer of the magnetic alloy ribbon. The stacked body of the magnetic alloy ribbon also indicates similarly. Even when the magnetic alloy ribbon is wound or stacked and a gap is formed between the magnetic alloy ribbon portions, it is included in the cross-sectional area (100%) of the magnetic core. Similarly, when there is an insulating layer (such as an insulation coating or an insulation film) between the magnetic ribbon portions, it is also included in the cross-sectional area (100%) of the magnetic core.

When it is configured to have the adhesive portion 4 partly penetrated into the doughnut-shaped magnetic core 2, bonding between the doughnut-shaped magnetic core 2 and the bottomed container 3 can be made strong by an anchor effect. When the penetration ratio is less than 5%, the anchor effect is not enough to satisfactorily fix the doughnut-shaped magnetic core 2 in the bottomed container 3. Therefore, there is a possibility that the doughnut-shaped magnetic core 2 is disconnected during transportation to fall in a state of making a rattling sound within the bottomed container 3. There is also a possibility of melting the adhesive portion 4 by heat during soldering to cause a dropout of the doughnut-shaped magnetic core 2.

When the penetration ratio of the adhesive portion 4 to the doughnut-shaped magnetic core 2 exceeds 30%, the stress applied to the doughnut-shaped magnetic core 2 becomes excessively large, and the magnetic characteristics of the doughnut-shaped magnetic core 2 might be adversely affected. The penetration ratio of the adhesive portion 4 to the doughnut-shaped magnetic core 2 is more preferably in a range of 10 to 20%. The penetration ratio of the adhesive portion 4 can be adjusted by adjusting the properties and coating amount of the used adhesive and the drying process.

For the shape of the bottomed container 3, it is preferable that the ratio (C/A) of the height (C) of the cylindrical outer wall portion to the height (A) of the cylindrical inner wall portion is in a range of 0.6 to 1.3. Thus, the adhesive coated on the open section of the bottomed container 3 is prevented from flowing over the cylindrical outer wall portion at the time of forming the adhesive portion 4. Therefore, the inductance element 1 can be suppressed from having an occurrence of defective appearance. It is more preferable that the C/A ratio is in a range of 1 to 1.1. Both the height (A) of the cylindrical inner wall portion and the height (C) of the cylindrical outer wall portion do not include the thickness of the bottom portion.

When the C/A ratio is less than 0.6, the cylindrical inner wall portion has a protruded shape, and an insertion property of the doughnut-shaped magnetic core 2 into the bottomed container 3 becomes extremely bad. Besides, there is a possibility that the adhesive leaks over the cylindrical outer wall portion before it becomes dry. When the hollow portion is covered, the adhesive is divided at the cylindrical inner wall portion. When the C/A ratio exceeds 1.3, the inner circumference of the doughnut-shaped magnetic core 2 tends to come onto the cylindrical inner wall portion, and the doughnut-shaped magnetic core 2 might be fixed obliquely.

When the height (C) of the cylindrical outer wall portion is not smaller than the height (A) of the cylindrical inner wall portion (C≧A), the coated adhesive tends to flow toward the hollow portion. The above characteristic can be used to dispose the adhesive portion 4 so as to cover the hollow portion on the side of the open section of the bottomed container 3 as shown in FIG. 1. By covering the hollow portion with the adhesive portion 4, a coating of the adhesive portion 4 is formed on the hollow portion.

When the hollow portion has the coating of the adhesive portion 4, the conductive lead is inserted through the hollow portion by breaking through the coating of the adhesive portion 4. Since the coating is formed of the adhesive portion 4, the coating of the adhesive portion 4 can be used for a fixing portion for fixing the inductance element 1 to the conductive lead. Use of the above function eliminates necessity of a fixing work using the adhesive or the like when a lead of a semiconductor element or the like is directly inserted through. And, a dropout is also prevented when the inductance element 1 having the conductive lead inserted through is attached to a printed-circuit board.

Since the inductance element 1 of this embodiment has the doughnut-shaped magnetic core 2 and the bottomed container 3 integrally fixed, its production process can be simplified, and the cost can be reduced. Since the adhesive portion 4 can be checked visually, a direction of the inductance element 1 can be checked easily. When the direction can be checked, the direction and alignment can be determined smoothly at the time of mounting on a substrate such as a wiring board.

The inductance element 1 is mounted on the wiring board with the conductive lead inserted through the hollow portion of the bottomed container 3. For the conductive lead which is inserted through the hollow portion of the bottomed container 3, a lead of a semiconductor element such as a diode may be used. Otherwise, a different conductive lead may be prepared and inserted through the hollow portion of the bottomed container to bond the tip end of the conductive lead to the wiring board.

To mount the inductance element 1 on the substrate, it is preferable that its side having the adhesive portion 4 is positioned on the side opposite to the substrate. To mount on the substrate, the conductive lead is fixed by soldering. There is also a possibility that the adhesive portion is melted by heat in the soldering process to cause a dropout of the doughnut-shaped magnetic core 2. For example, heat of the soldering process is transferred to the adhesive portion 4 through the lead, or the whole substrate is heated as in a reflow process. Even when heat is transferred to the adhesive portion 4, the adhesive portion 4 can be made insusceptible to the influence of heat by disposing the adhesive portion 4 on the side opposite to the substrate 6.

It is preferable that the conductive lead 5, which is inserted through the hollow portion of the inductance element 1, is formed of an electrically conductive metal such as Cu, Fe or an alloy having them as main components. The conductive lead portion 5 is not limited to have a particular wire diameter if it passes through the hollow portion. The length of the conductive lead is arbitrary, and it is adequate if the tip end of the bent conductive lead can be soldered to the wiring board. A portion (surface) other than the terminal portion of the conductive lead may be provided with an insulation coating. By forming a coating of tin plating or the like on the surface of the conductive lead 5, solderability can be improved.

The doughnut-shaped magnetic core 2 may be used in plural numbers. When the plural doughnut-shaped magnetic cores 2 are used, two or more of them may be arranged in series within the bottomed container 3, or the bottomed containers 3 each having the doughnut-shaped magnetic core 2 therein may be connected in plural numbers. To dispose two or more doughnut-shaped magnetic cores 2 in the bottomed container 3, only the magnetic core 2 which is on the side of the open section of the bottomed container 3 may be fixed with the adhesive portion 4. At this time, the penetration ratio of only the magnetic core 2 having the adhesive portion 4 may be measured. When the bottomed containers 3 each housing the plural doughnut-shaped magnetic cores 2 therein are connected in series, it is preferable that the individual magnetic cores 2 are fixed with the adhesive portion 4. At this time, the penetration ratio of each of the adhesive portions 4 shall be measured.

Figure 6:
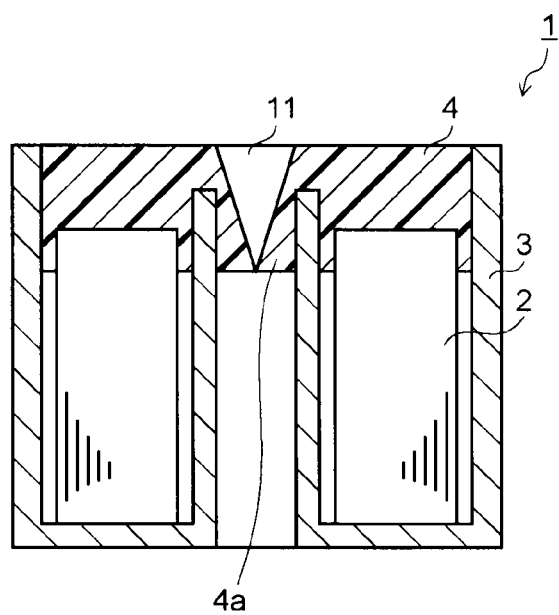
FIG. 6 is a sectional view showing a state that a lead insertion part is formed in an adhesive portion of the inductance element shown in FIG. 1.

In a case where the hollow portion of the bottomed container 3 is covered with the adhesive portion 4, it is preferable that a lead insertion part 11 is formed on a portion where the conductive lead is inserted, namely the adhesive portion 4 covering the hollow portion, as shown in for example FIG. 6. The lead insertion part 11 may have a shape selected from a concave, a hole and a notch. The lead insertion part 11 may be either a through type (through hole, through notch) or a depression type (recess). When the adhesive portion 4 has a thickness of exceeding 2 mm, the through type is preferable, and when it is 2 mm or below, the depression type is preferable.

Figure 7:
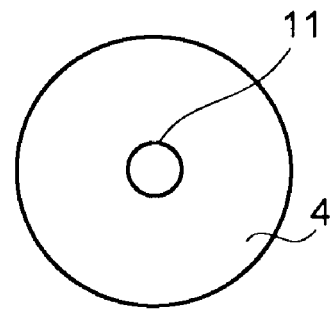
FIG. 7 is a diagram showing another example of the lead insertion part shown in FIG. 6.
Figure 8:
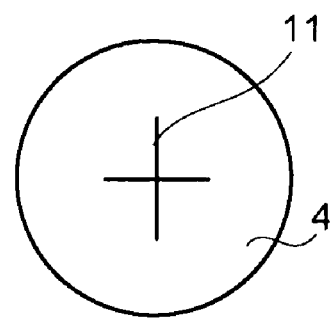
FIG. 8 is a diagram showing still another example of the lead insertion part shown in FIG. 6.
Figure 9:
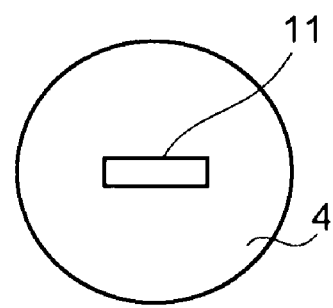
FIG. 9 is a diagram showing still another example of the lead insertion part shown in FIG. 6.

FIG. 7 through FIG. 9 are plan views of the adhesive portion 4 having the lead insertion part 11. FIG. 7 shows a circular lead insertion part 11. FIG. 8 shows a notch type lead insertion part 11. FIG. 9 shows a square type lead insertion part 11. The circle may be either a perfect circle or an ellipse. The notch may be a single notch or two or more notches. The lead insertion part 11 may have an entrance which has a polygonal shape such as a triangular shape or a square shape.

The entrance shape of the lead insertion part 11 is preferably selected depending on the shape of the inserting conductive lead.

Since the inductance element 1 of this embodiment does not have a lid, its production process can be simplified, and the production cost can be reduced substantially. In addition, lowering of the magnetic characteristics (such as reduction of value L) due to the stress at the time of curing of the adhesive can be suppressed by adjusting the penetration ratio of the adhesive portion 4. Therefore, the inductance element 1 exerts an excellent noise reducing effect. This inductance element 1 is suitably used as a noise suppression element for the electronic equipment such as a switching power supply.

The switching power supply is being used in various fields of PCs, servers and the like. Various elements are mounted on the wiring board for the switching power supply. The each element is fixed to the wiring board by soldering. Since countermeasures are taken for the inductance element 1 of this embodiment to prevent the adhesive portion 4 from being melted by heat during soldering, a problem such as a displacement or a dropout of the doughnut-shaped magnetic core 2 does not take place easily when soldering. Therefore, since the inductance element 1 also meets a reflow process, it becomes possible to improve the mass productivity of the switching power supply.

Figure 10:
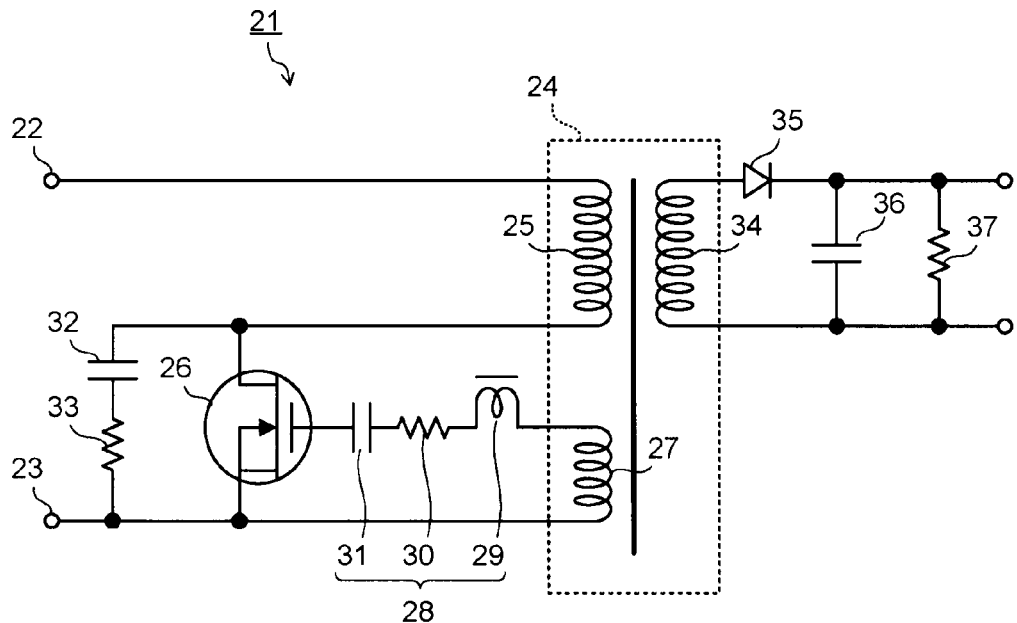
FIG. 10 is a diagram showing a structure of the switching power supply according to a first embodiment of the invention.

FIG. 10 is a circuit diagram showing a structure of the switching power supply according to the first embodiment of the invention. A self-excited fly-back type switching power supply 21 shown in FIG. 10 has a primary winding 25 of a transformer 24 connected in series between input terminals 22, 23 and FET (MOSFET) 26 as a switching element. The transformer 24 is further provided with a winding 27 for a gate circuit drive of the FET 26. In other words, the winding 27 is a positive feedback winding of the transformer 24 which is wound to make the self-oscillation of the FET 26.

A drive circuit 28 for sending the signal of the positive feedback winding 27 to the FET 26 is disposed between the gate terminal of the FET 26 and the positive feedback winding 27. The drive circuit 28 is configured by connecting in series an inductor 29, a resistor 30 and a capacitor 31, and functions as a snubber circuit. The resistor 30 gives an appropriate drive current to the FET 26, and the capacitor 31 improves the drive property of the FET 26. The inductor 29 has saturability and a function to delay the gate signal of the FET 26. The inductance element 1 of the embodiment is applied to the saturable inductor 29 and functions as a noise suppression element of the FET 26.

A snubber capacitor 32 for absorbing a surge voltage which is generated in the primary winding 25 of the transformer 24 is connected in series between the primary winding 25 of the transformer 24 and the input terminal 23. The snubber capacitor 32 is connected parallel to the FET 26. In addition, a snubber resistor 33 is connected in series to the snubber capacitor 32. A rectifying element 35 and a capacitor 36 are connected as a rectifying/smoothing circuit to a secondary winding 34 of the transformer 24. A resistor 37 is a load.

Figure 11:
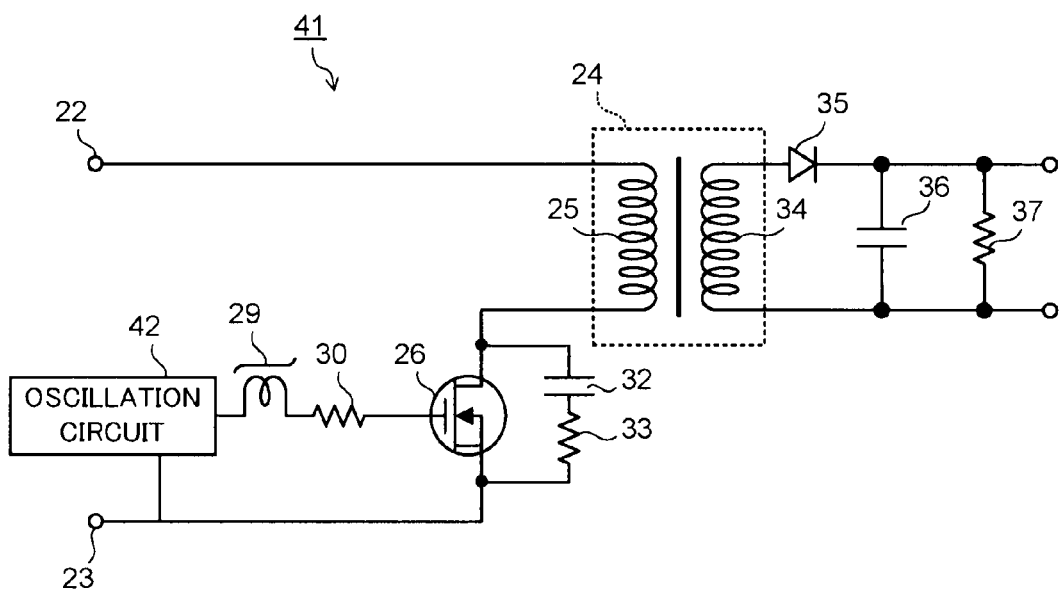
FIG. 11 is a diagram showing a structure of the switching power supply according to a second embodiment of the invention.

FIG. 11 is a circuit diagram showing a structure of the switching power supply according to the second embodiment of the invention. A separately-excited fly-back type switching power supply 41 shown in FIG. 11 is provided with a oscillation circuit 42 as a drive circuit of the FET 26. A saturable inductor 29 and a resistor 30 are connected in series between the FET 26 and the oscillation circuit 42. The saturable inductor 29 functions as the noise suppression element of the FET 26 similar to the first embodiment, and the inductance element 1 of the embodiment is applied.

Figure 12:
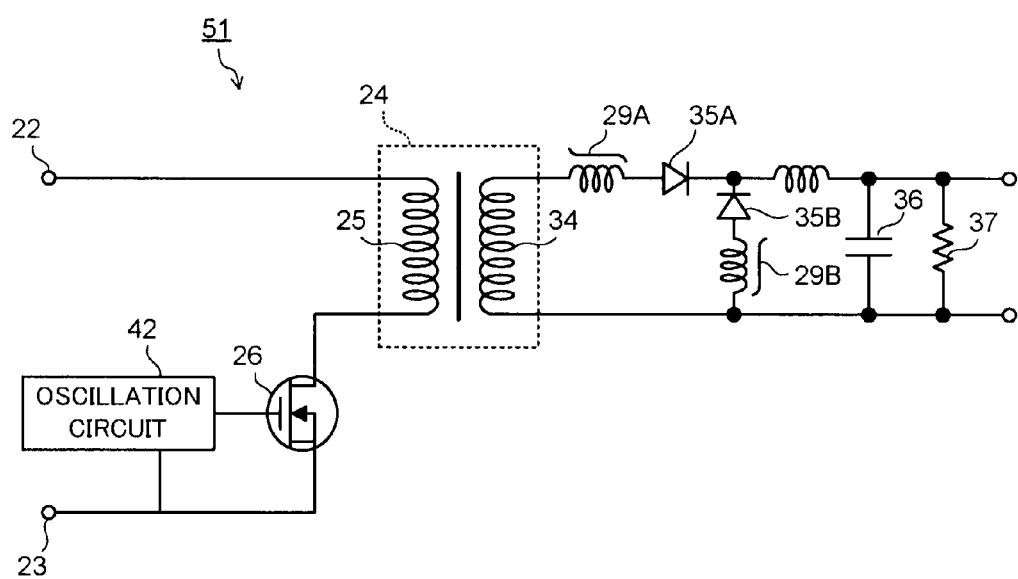
FIG. 12 is a diagram showing a structure of the switching power supply according to a third embodiment of the invention.

FIG. 12 is a circuit diagram showing a structure of the switching power supply according to a third embodiment of the invention. A forward converter type switching power supply 51 shown in FIG. 12 is provided with the oscillation circuit 42 as the drive circuit of the FET 26. Rectifying elements 35A, 35B which are disposed on a secondary side of the transformer 24 are connected with saturable inductors 29A, 29B respectively. The saturable inductors 29A, 29B function as a noise suppression element for the rectifying elements 35A, 35B, and the inductance element 1 of the embodiment is applied for that.

Specific examples of the present invention and the evaluated results are described below.

EXAMPLES 1 TO 6, COMPARATIVE EXAMPLES 1 TO 2

An amorphous magnetic alloy ribbon (thickness of 18 μm) having a composition of $(Co_{0.94}Fe_{0.05}Cr_{0.01})_{72}Si_{15}B_{13}$ was wound to form a doughnut-shaped magnetic core (toroidal core). An insulation coating was previously formed on a surface of the magnetic alloy ribbon. The doughnut-shaped magnetic core was determined to have an outer diameter of 3 mm, an inner diameter of 2 mm and a height of 3 mm.

The doughnut-shaped magnetic core was then housed in a PBT bottomed container (outermost diameter 3.4 mm, innermost diameter 1.6 mm, highest height 4.5 mm, thickness 0.1 mm). The bottomed container was determined to have [(height of outer wall portion 4.1 mm-height of inner wall portion 3.2 mm)=0.9 mm]. Then, the magnetic core and the container were integrally fixed with an acryl modified silicone resin-based adhesive (manufactured by Cemedine Co., Ltd., SX720W (trade name)). The shape of the extended portion, which was the adhesive portion partly extended into the inner wall portion, was adjusted by changing drying and curing conditions of the adhesive.

Thus, the inductance elements of Examples 1 to 4 and Comparative Examples 1 to 2 were produced as described above. In addition, the inductance element of Example 5 was produced with the adhesive changed to an epoxy resin-based type (manufactured by Sanyu Rec Co., Ltd., EX-664/H-390 (trade name) two liquid curing type). The inductance element of Example 6 was produced with the adhesive changed to a phenol resin-based type (manufactured by Sumitomo Bakelite Co., Ltd., PR-53365 (trade name)). In the individual examples, the adhesive portion was formed to cover the open section including the hollow portion. The adhesive portion covering the hollow portion was adjusted to have a thickness of 0.7 to 1.2 mm. For Comparative Example 1 and Comparative Example 2, the thickness of the adhesive portion covering the hollow portion was adjusted according to a ratio of (length (B) of extended portion/height (A) of inner wall portion).

A conductive lead having a wire diameter of 0.8 mm was inserted into the inductance element of each of the individual examples and comparative examples, and the occurrence ratio was measured for an insertion failure whether the conductive lead was broken or the adhesive portion was separated. A tin-plated soft copper wire was used for the conductive lead. The conductive lead portion was inserted from the side of the adhesive portion into the hollow portion of the inductance element.

In addition, the individual inductance elements were measured for value L. For the value L, an initial value and a value (accelerated test value) after a 1000-hour operation in a constant temperature bath kept at 120° C. were measured, and a change rate in the value L after the 1000-hour operation was determined. The value L was measured with an LCR meter under conditions of a frequency of 50 kHz, 1V, one turn and room temperature. Hardness (Shore hardness A) of the adhesive portion was measured according to JIS-Z-2246. The measured results are shown in Table 1.

TABLE 1

| | Adhesive | Length B of extended portion/height A of inner wall portion (ratio) | Hardness of adhesive portion (Shore A) | Value L (μH) | Change rate of value L after 1000 hours (%) | Occurrence rate of insertion failure of lead portion (%) |
|---|---|---|---|---|---|---|
| Example 1 | Acryl modified silicone resin | 0.1 | 65 | 5 | 10-25% down | 2 |
| Example 2 | Acryl modified silicone resin | 0.2 | 65 | 5 | 10-25% down | 2 |
| Example 3 | Acryl modified silicone resin | 0.3 | 65 | 5 | 10-25% down | 3 |
| Example 4 | Acryl modified silicone resin | 0.4 | 65 | 4.9 | 10-25% down | 3 |
| Example 5 | Epoxy resin | 0.3 | 80 | 4.1 | 30-50% down | 100 |
| Example 6 | Phenol resin | 0.3 | 70 | 4.5 | 20-40% down | 40 |
| Comparative Example 1 | Acryl modified silicone resin | 0.01 | 65 | 5 | 10-25% down | 20 |
| Comparative Example 2 | Acryl modified silicone resin | 0.9 | 65 | 4.7 | 15-30% down | 6 |

As shown in Table 1, the inductance elements of the examples have a large initial value L, and their deterioration after a 1000-hour operation is small. It means that the original value L which is substantially determined according to the material characteristics of the magnetic core is obtained. In Examples 5, 6 in which the resins had high hardness, a change rate of the value L after 1000 hours was somewhat larger than in other examples.

It is seen that both the inductance elements of Comparative Example 1 and Comparative Example 2 have a high occurrence rate of the lead insertion failure. In Comparative Example 1, since the extended portion of the adhesive portion had a short length, there was a phenomenon that the adhesive portion was separated when the lead was inserted. In Comparative Example 2, the extended portion had a large length, and the adhesive portion covering the hollow portion became thick, resulting in an occurrence of an insertion failure due to deformation of the lead such as its bending at the time of lead insertion.

EXAMPLES 7 TO 10

The inductance element of Example 3 was used to prepare the adhesive portion covering the hollow portion provided with the lead insertion part shown in Table 2, and the same measurement was conducted. The results are shown in Table 2.

As shown in Table 2, occurrence of the insertion failure of the conductive lead can be suppressed substantially by forming a lead insertion part on the adhesive portion covering the hollow portion. The lead insertion failure can be improved when the shape of the lead insertion part is a through type. Even when the lead insertion part was disposed, lowering or the like of the value L was not seen.

EXAMPLES 11 TO 16

The inductance elements of Example 2, Example 7, Example 8 and Example 10 were prepared. The lead portion (TO-3P type, rectangular of width 1.2 mm and thickness 0.6 mm) of a diode was inserted through each of the inductance elements. Subsequently, the lead portion of the diode was soldered onto a wiring board. After the soldering process, displacement of the inductance element and an occurrence rate of a dropout of the adhesive were measured. The soldering process was performed within three seconds by means of a soldering iron (350° C.). The results are shown in Table 3.

TABLE 2

| | Length B of extended portion/ height A of inner wall portion (ratio) | Shape of insertion portion | Value L (μH) | Change rate of value L after 1000 hours (%) | Occurrence rate of defective insertion of lead portion (%) |
|---|---|---|---|---|---|
| Example 7 | 0.3 | Recessed portion (Non-through type) | 5 | 10-25% down | 1 |
| Example 8 | 0.3 | Hole portion (through hole) [Through hole dia. < lead dia.] | 5 | 10-25% down | 0 |
| Example 9 | 0.3 | Hole portion (through hole) [Through hole dia. > lead dia.] | 5 | 10-25% down | 0 |
| Example 10 | 0.3 | Notch portion (through type) | 5 | 10-25% down | 0 |

TABLE 3

| | Inductance element | Direction of adhesive portion | Occurrence rate of displacement/dropout of adhesive after soldering process (%) |
|---|---|---|---|
| Example 11 | Example 2 | Opposite to wiring board (diode side) | 4 |
| Example 12 | Example 7 | Opposite to wiring board (diode side) | 0.5 |
| Example 13 | Example 8 | Opposite to wiring board (diode side) | 1 |
| Example 14 | Example 10 | Opposite to wiring board (diode side) | 1 |
| Example 15 | Example 2 | Same side as wiring board (lead tip end side) | 8 |
| Example 16 | Comparative Example 7 | Same side as wiring board (lead tip end side) | 6 |

As shown in Table 3, when the lead is inserted from the direction of the adhesive portion opposite to the wiring board, namely from the side of the adhesive portion, the occurrence of displacement or a dropout of the adhesive can be prevented. It is not shown in the table but Example 9 does not have an effect of fixing the inductance element when the lead is inserted because an insertion portion has a diameter larger than the lead diameter, and therefore it is excluded from the examples.

EXAMPLES 17 TO 22

The inductance element of Example 3 was used and the height of the outer wall portion and the height of the inner wall portion of the bottomed container were changed as shown in Table 4. The ratio of defective appearance caused by the adhesive portion overflown onto the container surface was measured. The results are shown in Table 4.

TABLE 4

| | Height of outer wall portion of bottomed container (mm) | Height of inner wall portion of bottomed container (mm) | Height of outer wall/height of inner wall | Ratio of defective appearance (%) |
|---|---|---|---|---|
| Example 17 | 4.1 | 3.2 | 0.76 | 5 |
| Example 18 | 4.1 | 3.7 | 0.9 | 1 |
| Example 19 | 4.1 | 4.1 | 1 | 0 |
| Example 20 | 4.1 | 4.9 | 1.2 | 3 |
| Example 21 | 4.6 | 4.1 | 0.89 | 0 |
| Example 22 | 4.6 | 4.6 | 1 | 0 |
| Reference Example 1 | 4.1 | 2.2 | 0.54 | 23 |
| Reference Example 2 | 4.1 | 5.8 | 1.41 | 81 |

As shown in the table, when a ratio (C/A ratio) of the height (C) of the outer wall portion and the height (A) of the inner wall portion of the bottomed container is changed, fixing of the magnetic core in the container is not enough if the C/A ratio is smaller than 0.6, and the magnetic core is often disposed obliquely with respect to the inner wall portion, resulting in an increase of the rate of defective appearance. When the C/A ratio exceeds 1.3, the adhesive leaks from the outer wall portion, and the defective appearance in such a mode increases. Especially, when a ratio of the height (C) of outer wall portion/height (A) of inner wall portion is in a range of 0.9 to 1.2, an occurrence rate of defective appearance can be decreased to 3% or below.

EXAMPLES 23 TO 26

The same inductance element as in Example 3 was prepared except that a predetermined amount of the adhesive portion was penetrated into a cross-sectional area of the doughnut-shaped magnetic core, and the same measurement as in Example 1 was conducted. The penetration ratio of the adhesive portion to the doughnut-shaped magnetic core was adjusted by disposing in an enclosed space after the adhesive was coated, drying while drawing a vacuum and adjusting a degree of vacuum. The results are shown in Table 5.

TABLE 5

| | Penetration ratio of adhesive portion to magnetic core (%) | Value L (μH) | Change rate of value L after 1000 hours (%) | Occurrence rate of defective insertion of lead portion (%) |
|---|---|---|---|---|
| Example 23 | 5 | 5 | 10-25% down | 1.2 |
| Example 24 | 10 | 4.9 | 10-25% down | 0 |
| Example 25 | 25 | 4.7 | 20-35% down | 1 |
| Reference Example 3 | 50 | — | — | — |
| Reference Example 4 | 1 | 5 | 10-25% down | 24 |

As shown in the table, when the adhesive portion is penetrated into the doughnut-shaped magnetic core and the penetration ratio of the adhesive portion is less than 5%, there is an increase in defective appearance due to a dropout of the adhesive when the lead is inserted. Especially, in a case where the hollow portion is filled, the defect tends to increase furthermore. Generally, a magnetic core formed by winding a magnetic material having a thickness of around 20 μm has about 25% of a ratio of an air layer in the cross-sectional area, and when the adhesive portion is penetrated to about 50%, the shape cannot be maintained, and the outer diameter is increased to make it impossible to measure. When the penetration ratio is high, the value L (initial value) also tends to degrade, and a degradation speed accelerates in an accelerated test under high temperatures. The penetration ratio of the adhesive portion to the doughnut-shaped magnetic core is preferably in a range of 10 to 20%.

EXAMPLES 27 TO 30

The value L was measured in the same manner as in Example 1 with the magnetic core size changed as shown in Table 6. For the adhesive, an acryl modified silicone resin-based adhesive was used. The results are shown in Table 6. The inner wall's outer diameter of the container size in the Table means a diameter of the inside of the outer wall portion. The outer wall's inner diameter means a diameter of the outside of the inner wall portion. The inner wall's height means a height of the inner wall portion. The inductance elements of the examples had good results even when the magnetic core size was changed.

TABLE 6

|  | Magnetic core size (mm) [outer dia. × inner dia. × height] | Container size (mm) [outer wall's inner dia. × inner wall's outer dia. × inner wall's height] | Length B of extended portion/ height A of inner wall portion (ratio) | Hardness of adhesive portion (Shore A) | Value L (µH) |
|---|---|---|---|---|---|
| Example 27 | 3 × 2 × 4.5 | 3.2 × 1.8 × 4.7 | 0.15 | 65 | 7.0 |
| Example 28 | 3 × 2 × 4.5 | 3.2 × 1.8 × 4.7 | 0.35 | 65 | 6.8 |
| Example 29 | 4 × 2 × 4.5 | 4.2 × 1.8 × 4.7 | 0.20 | 65 | 12.0 |
| Example 30 | 4 × 2 × 4.5 | 4.2 × 1.8 × 4.7 | 0.45 | 65 | 11.5 |

EXAMPLES 31 TO 32

A 3 mm wide Co-based amorphous alloy ribbon (composition: $Co_{73}Fe_5Nb_2Si_{12}B_8$) was shaped to have a size of an outer diameter of 3 mm, an inner diameter of 2 mm and a height of 3 mm, and a distortion removal thermal treatment was performed at 350° C. or higher to produce a doughnut-shaped magnetic core. The bottomed container was formed of a PBT resin (manufactured by WinTech Polymer Ltd., 2092). The doughnut-shaped magnetic core was housed in the bottomed container, and an adhesive (manufactured by Cemedine Co., Ltd., acryl modified silicone resin SX720W (trade name)) was coated from the opening. A drying treatment was performed in a constant temperature bath under conditions of 120° C. for one hour to obtain the inductance elements of Examples 31, 32. The adhesive cured by drying was partly extended into the inner wall portion of the bottomed container to form an extended portion. A ratio between the length of the extended portion and the height of the inner wall portion was 0.3.

The inductance element of Example 32 was formed to have a lead insertion part (recessed portion) on the adhesive portion. The inductance element of Example 31 did not have a lead insertion part. Yields when the inductance elements were produced and an occurrence rate of defective mounting when the inductance elements were mounted were measured. As a comparative example, an inductance element with a lid welded was measured for its production yield and the occurrence rate of defective mounting. The results are shown in Table 7.

TABLE 1

|  | Occurrence rate of defective production of inductance element (%) | Occurrence rate of defective mounting of inductance element (%) |
|---|---|---|
| Example 31 | 3 | 3 |
| Example 32 | 1 | 0.2 |
| Comparative Example | 2 | 0.2 |

As described above, the inductance elements of the examples can prevent the magnetic characteristics from degrading and can also improve the mass productivity and reduce the production cost. Since the mountability on the wiring board is also good, the productivity of electronic equipment such as the switching power supply can also be enhanced.

INDUSTRIAL APPLICABILITY

Since the inductance element of the invention need not the use of a lid, the production cost can be reduced, and the mass productivity can be improved. In addition, since the magnetic characteristics can be prevented from degrading when the adhesive portion is used for fixing, the inductance element having excellent magnetic characteristics can be provided. This inductance element is suitably used as a noise suppression element (saturable inductor) of the switching power supply or the like.

What is claimed is:

1. An inductance element, comprising:
a doughnut-shaped magnetic core;
a bottomed container having a cylindrical outer wall portion, a cylindrical inner wall portion arranged within the cylindrical outer wall portion, a bottom portion disposed at an end of each of the cylindrical outer wall portion and the cylindrical inner wall portion to close a space between them, an open section provided at the other end of each of the cylindrical outer wall portion and the cylindrical inner wall portion and a hollow portion disposed within the cylindrical inner wall portion, wherein the doughnut-shaped magnetic core is housed between the cylindrical outer wall portion and the cylindrical inner wall portion; and
an adhesive portion, disposed on the side of the open section of the bottomed container, integrally fixing the doughnut-shaped magnetic core and the bottomed container,
wherein the adhesive portion has an extended portion extended into the cylindrical inner wall portion, and a ratio (B/A) of a length (B) of the extended portion to a height (A) of the cylindrical inner wall portion is in a range of 0.1 to 0.5.

2. The inductance element according to claim 1, wherein the open section of the bottomed container including the hollow portion is covered with the adhesive portion.

3. The inductance element according to claim 2, wherein at least a lead insertion part selected from a concave, a hole and a notch is formed in the adhesive portion.

4. The inductance element according to claim 1, wherein the doughnut-shaped magnetic core has a wound body of a magnetic alloy ribbon or a stacked body of magnetic alloy ribbons.

5. The inductance element according to claim 4, wherein the magnetic alloy ribbon is provided with an amorphous magnetic alloy ribbon.

6. The inductance element according to claim 1, wherein the adhesive portion penetrates to a range of 5 to 30% of a cross-sectional area of the doughnut-shaped magnetic core.

7. The inductance element according to claim 1, wherein the adhesive portion is formed of a cured body of an acryl modified silicone resin-based adhesive.

8. The inductance element according to claim 1, wherein a conductive lead portion is inserted into the hollow portion of the bottomed container.

9. The inductance element according to claim 1,
wherein a ratio (C/A) of a height (C) of the cylindrical outer wall portion to the height (A) of the cylindrical inner wall portion is in a range of 0.6 to 1.3.

10. A method for manufacturing an inductance element, comprising:
housing a doughnut-shaped magnetic core into a bottomed container having a cylindrical outer wall portion, a cylindrical inner wall portion disposed within the cylindrical outer wall portion, a bottom portion disposed at an end of each of the cylindrical outer wall portion and the cylindrical inner wall portion to close a space between them, an open section provided at the other end of each of the cylindrical outer wall portion and the cylindrical inner wall portion and a hollow portion disposed within the cylindrical inner wall portion;
coating an adhesive on a side of the open section of the bottomed container in which the doughnut-shaped magnetic core is housed; and
forming an adhesive portion, which integrally fixes the doughnut-shaped magnetic core and the bottomed container, by drying the adhesive for curing.

11. The method for manufacturing an inductance element according to claim 10,
wherein the adhesive is dried at a temperature in a range of 90 to 150° C.

12. The method for manufacturing an inductance element according to claim 10,
wherein the adhesive portion is formed to extend into the cylindrical inner wall portion, and a ratio (B/A) of a length (B) of a portion having the adhesive portion extended to a height (A) of the cylindrical inner wall portion is in a range of 0.1 to 0.5.

13. The method for manufacturing an inductance element according to claim 10,
wherein the open section including the hollow portion of the bottomed container is covered with the adhesive portion.

14. The method for manufacturing an inductance element according to claim 10, further comprising,
forming at least a lead insertion part selected from a concave, a hole and a notch, in the adhesive portion.

15. A switching power supply comprising the inductance element according to claim 1 as a noise suppression element.

* * * * *